Sept. 18, 1962 A. ASHKIN ET AL 3,054,964

LOW NOISE ELECTRON BEAM AMPLIFIER WITH LOW PUMP FREQUENCY

Filed May 26, 1960 3 Sheets-Sheet 1

INVENTORS: A. ASHKIN
E. I. GORDON
BY David P. Kelley
ATTORNEY

LOW NOISE ELECTRON BEAM AMPLIFIER WITH LOW PUMP FREQUENCY

Filed May 26, 1960 3 Sheets-Sheet 2

INVENTORS: A. ASHKIN
E. I. GORDON
BY David P. Kelley
ATTORNEY

LOW NOISE ELECTRON BEAM AMPLIFIER WITH LOW PUMP FREQUENCY

Filed May 26, 1960 3 Sheets-Sheet 3

INVENTORS: A. ASHKIN
E. I. GORDON
BY David P. Kelley
ATTORNEY

United States Patent Office 3,054,964
Patented Sept. 18, 1962

3,054,964

LOW NOISE ELECTRON BEAM AMPLIFIER WITH LOW PUMP FREQUENCY

Arthur Ashkin, Bernardsville, and Eugene I. Gordon, Morristown, N.J., assignors to Bell Telephone Laboratories, Incorporated, New York, N.Y., a corporation of New York Filed May 26, 1960, Ser. No. 31,941
12 Claims. (Cl. 330—43)

This invention relates to electron beam devices and, more particularly, to high frequency electromagnetic wave amplifiers.

Electron beam velocity modulation devices such as the conventional traveling wave tube have proven capable of amplifying high-frequency electromagnetic waves with reasonably high efficiency and stability over a relatively wide band of frequencies. Detracting from these advantages, however, is the noise which results from signal wave interaction with an electron beam.

The conventional traveling wave tube achieves electromagnetic signal wave amplification through space-charge wave modulation of an electron beam. Any space-charge wave which inherently exists on the beam, or is introduced onto the beam through modulation by some outside source, may propagate along the beam at either of at least two phase velocities, the faster of these velocities at any given frequency being higher than the mean or D.-C. velocity of the beam, whereas the slower velocity is lower than the beam's D.-C. velocity. The range of phase velocities which represents beam wave propagation at a velocity higher than the D.-C. velocity of the beam will hereinafter be referred to generically as the fast mode, while those phase velocities which represent wave propagation at a velocity lower than the D.-C. velocity will be referred to as the slow mode.

A conventional traveling wave tube effects amplification through electromagnetic signal wave interaction with the slow mode of the electron beam, as is well known. The unique characteristics of the slow mode which permit wave amplification are disadvantageous in that spurious noise power, which exists in both the slow and fast modes of the beam, cannot be extracted by ordinary methods. This is due to the equally well-known fact that power transmitted in the slow mode is negative with respect to the D.-C. power of the beam; that is, the presence of a slow mode wave results in a decrease in total beam power.

One of the major advances in the art in recent years is the discovery that the principles of parametric amplification can be applied to electron beam devices to permit interaction in the fast mode of the beam. This achievement is significant because noise power that propagates as a fast wave can conveniently be extracted from the beam and therefore beam noise can be theoretically prevented from appearing at the output with the amplified signal wave.

It has been found that parametric amplification is often more successful when used in conjunction with cyclotron wave, rather than space-charge wave, interaction. In devices that utilize cyclotron wave interaction, the circuit that couples wave energy to the beam is designed such that the electric fields associated with the waves have a component transverse to the direction of flow of the beam. In the presence of a longitudinal magnetic focusing field, the resultant transverse forces produce transverse or rotational velocity components on the electrons of the beam, whereby these particles are caused to follow substantially helical trajectories; the phase positions of successive rotating electrons as they pass through a fixed plane transverse to the beam define a cyclotron wave. The interaction principles that apply to cyclotron-wave devices are analogous to those that apply to space-charge wave devices.

Generally speaking, amplification through electron beam interaction can be said to result from "active" coupling between two waves, one of which may propagate on an external slow wave circuit. In the conventional traveling wave tube, signal wave energy on an external circuit couples with the slow signal mode of the beam to excite a slow signal wave on the beam. The excitation of the slow signal wave results in a loss of D.-C. beam power, which power is ultimately converted to electromagnetic signal wave energy to provide amplification. In most parametric amplifiers a source of pump energy is coupled to the beam, the pump frequency usually being about twice the signal frequency. The pump frequency and the signal frequency define a lower sideband "idler" frequency which is equal to the difference of the pump and signal frequencies. Under certain conditions, strong active coupling may be induced between the fast mode signal and idler frequency waves, with the energy for amplification of the exponentially growing wave being ultimately derived from the pump source.

It is obvious, by comparison to the conventional traveling wave tube, that parametric amplifiers are generally disadvantageous from the standpoint that an additional source of high-frequency wave power is required. This disadvantage is overcome by the device disclosed in the application of E. I. Gordon, Serial No. 854,737, filed November 23, 1959, wherein an array of electrostatically charged quadrupoles are used to provide the parametric variations necessary for fast cyclotron wave amplification. This device represents a sort of "hydrid" traveling wave tube parametric amplifier in that active coupling is induced between the fast signal cyclotron wave and the slow mode idler cyclotron wave. Because excitation of the slow idler wave represents a loss of beam power, energy for amplification is derived from the D.-C. energy of the beam. Although fast signal wave energy can be extracted from the beam of the Gordon device, slow idler mode noise, which cannot be extracted, may possibly appear at the output with the amplified signal wave.

It is, therefore, an object of this invention to provide low noise amplification of electromagnetic wave energy.

It is another object of this invention to reduce, or eliminate altogether, the high pump frequency and high pump power requirements in a low-noise high-frequency electromagnetic wave amplifier.

These and other objects of the present invention are attained in an illustrative embodiment thereof comprising an electron gun for forming and projecting an electron beam. This beam is focused by a magnetic field which is substantially parallel with the path of flow of the beam. Signal wave energy is introduced into the device by input apparatus and appropriate means are included for causing transverse signal field components to interact with the beam. This interaction results in amplification of the signal wave, the amplified wave thereafter being removed from the device and transmitted to an appropriate load.

As has been pointed out, energy can be propagated along an electron beam as a space-charge wave through longitudinal velocity modulation, or as a cyclotron wave through transverse velocity modulation. In addition, energy can be transferred to, or removed from, an electron beam by transverse electron displacement modulation. A large number of such transversely displaced electrons can be analyzed in terms of beam wave motion; since the only velocities of these particles result from their D.-C. kinetic energy, the waves associated with them propagate in synchronism with the D.-C. beam velocity, and are therefore called synchronous waves. Synchronous waves are analogous to space-charge and cyclotron waves in that they can actively couple to electromagnetic waves, and can be excited by either adding or extracting energy from the beam. In order to preserve this analogy, "negative-power" synchronous waves, that is, those representing a lower energy level than the D.-C. kinetic energy of the beam, will be referred to as slow synchronous waves, while positive-power synchronous waves will be referred to as fast synchronous waves, in spite of the fact that all synchronous waves propagate at the same phase velocity.

We have have found that, under certain conditions, it is possible to convert beam energy propagating in the cyclotron mode to synchronous mode energy, and vice versa. As will become clear hereinafter, there are a variety of ways in which this phenomenon can be usefully employed to achieve lower noise operation than would otherwise be attainable. It can be shown, for example, that a substantially noiseless synchronous mode can be produced by using a low magnetic field at the cathode. Techniques for interacting with the synchronous mode are not, however, presently advanced to the point that such interaction is always feasible. With our invention, the noiselessness of the slow synchronous mode can be transferred to the slow cyclotron mode; interaction with the slow cyclotron mode can be effected by conventional techniques. As another example, the first cyclotron mode can be stripped of its noise by well-known apparatus. By the use of our invention, this noiselessness can be transferred to the slow synchronous mode and thereafter be transferred to the slow cyclotron mode. Both of these applications of our invention permit conventional slow mode interaction, thereby obviating the necessity of pump energy for amplification, and still achieve the low-noise characteristics heretofore only attainable through parametric amplification. Accordingly, one aspect of this invention is the conversion of cyclotron wave energy to synchronous wave energy. Another aspect of this invention is the conversion of synchronous wave energy to cyclotron wave energy.

It is a feature of this invention that a coupler for producing parametric variations on the beam to effect energy transfer between the cyclotron and synchronous modes be included between the electron gun and the interaction region.

It is another feature of this invention that the frequency of the aforementioned parametric variations be substantially equal to the inherent cyclotron frequency of the beam.

Under these conditions it can be shown that periodic energy exchanges will occur between the cyclotron and synchronous modes. These energy exchanges between predetermined frequency modes are analogous to the well-known Kompfner-dip phenomenon. It is still another feature of this invention that the length L that the coupler extends along the beam path be substantially determined by:

$$L=\frac{(2n-1)}{2}\,\frac{\pi u_0 B}{|\text{grad } E_b|}$$

where $u_0$ is the mean, or D.-C., beam velocity, $|\text{grad } E_b|$ is the electric field gradient at the center of the beam, B is the magnitude of the magnetic flux density of the longitudinal focusing field, and $n$ is any integer. As the beam leaves the coupler of length L, all of the beam energy that formerly propagated in a particular cyclotron mode will propagate in a predetermined synchronous mode and vice versa.

It is a feature of certain embodiments of this invention that the coupler produce an electrodynamic quadrupole field throughout the beam which alternates with time at a higher frequency than the frequency of either of the two modes interchanging energy. This type of coupler will hereinafter be referred to as a high-frequency coupler. It can be shown that a high-frequency coupler can effect energy transfer between the fast cyclotron mode and the slow synchronous mode and between the fast synchronous mode and the slow cyclotron mode.

It is a feature of certain other embodiments of this invention that the coupler produce an electric quadrupole field throughout the beam which alternates with time at a lower frequency than the frequency of one or both of the modes interchanging energy. This type of coupler will hereinafter be referred to as a low-frequency coupler. It can be shown that a low-frequency coupler can effect energy transfer between the fast cyclotron and fast synchronous modes and between the slow cyclotron and slow synchronous modes. An electrostatically charged coupler of the general type disclosed in the aforementioned Gordon application inherently fulfills this requirement because there is no time alternating component; the parametric variations produced on the beam result solely from spatial alternations of the electric field.

It is a feature of an illustrative embodiment of this invention that there be arranged axially between the electron gun and the interaction circuit the following: a fast cyclotron mode noise stripping apparatus, a high-frequency coupler, and a low-frequency coupler. The noise stripping apparatus extracts signal frequency fast cyclotron wave noise from the beam to produce a substantially noiseless fast cyclotron signal mode. The high-frequency coupler transfers slow synchronous mode energy at the signal frequency to the fast cyclotron mode and vice versa, so that as the beam leaves the high-frequency coupler its slow synchronous signal frequency mode is substantially noiseless. Next, the low-frequency coupler transfers signal frequency energy between slow synchronous and slow cyclotron modes so that the beam enters the interaction region with a substantially noiseless slow cyclotron mode. The signal wave can then be allowed to interact with the slow cyclotron mode in a conventional manner to produce substantially noiseless amplification.

These and other objects and features of the present invention will be more clearly understood with a consideration of the following description, taken in conjunction with the accompanying drawings in which.

Figure 1:
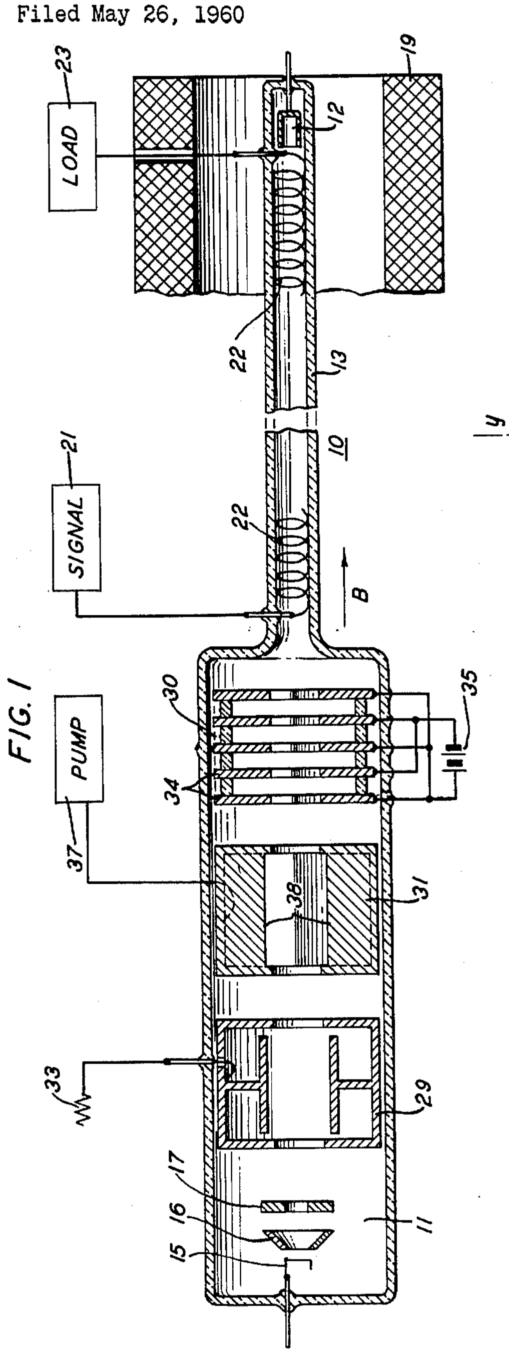
FIG. 1 is a sectional view of one embodiment of this invention.

Referring now to FIG. 1, there is shown schematically one illustrative embodiment of our invention comprising an electron beam device 10 having an electron gun 11 and a collector 12 at opposite ends of an evacuated envelope 13. Electron gun 11 comprises a cathode 15, a focusing electrode 16 and an accelerating electrode 17, which cooperate to form and project a beam of electrons along a path that is terminated by collector 12. The various electrodes are biased in a well-known manner by a battery which, for purposes of simplicity, has not been shown. The beam is focused and thereby constrained from impinging on envelope 13 by a magnet 19 which produces a magnetic field throughout device 10 in the direction of arrow B.

An electromagnetic signal wave from signal source 21 is propagated in interacting relationship with the slow cyclotron mode of the electron beam by a slow wave circuit 22. Slow wave circuit 22 is excited so that the R-F electric fields E associated with the signal wave are primarily transverse with respect to the direction of the magnetic field B.

Figure 2:
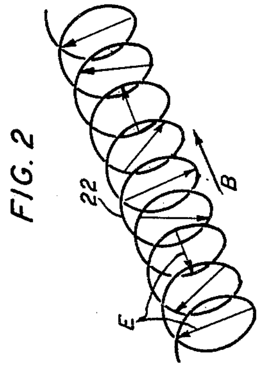
FIG. 2 is a perspective view of the slow wave circuit of the device of FIG. 1.

FIG. 2 is a perspective view of helix 22 and has been included to illustrate the configuration of the interacting transverse electric fields E. Whenever electrons in a magnetic field are subjected to forces transverse to the field, they will rotate at an angular frequency, called the cyclotron frequency, which is proportional to the strength of the magnetic field. The transverse forces on the electron beam of device 10 resulting from electric fields E therefore produce transverse velocity modulations on the beam which, in turn, define a cyclotron wave. The phase velocity and polarization of the signal wave traveling on circuit 22 is adjusted so that the cyclotron wave excited on the electron beam has a phase velocity which is lower than the beam's D.-C. velocity. The excitation of a slow cyclotron wave at the signal frequency results in a conversion of D.-C. beam kinetic energy to signal frequency energy; the coupled signal wave thereby grows exponentially with distance as is known in the art. Subsequent to amplification, the signal wave is removed from device 10 and transmitted to an appropriate load 23.

A serious impediment to the faithful, efficient amplification of signal waves through slow cyclotron mode interaction is the noise, or spurious beam modulations, which exist on any electron beam. Before considering how the deleterious effects of such noise can be substantially eliminated, a more detailed discussion of beam modulation is perhaps warranted.

Generally speaking, three types of waves can be excited on a beam through three types of modulation: space-charge waves are produced through longitudinal velocity modulation of the electrons of the beam; cyclotron waves are produced through transverse velocity modulation of the electrons; synchronous waves are produced through transverse displacement modulation of the electrons. Inasmuch as space-charge waves produce only second or third order effects on the operation of the present device, they will not be discussed.

Figure 3:
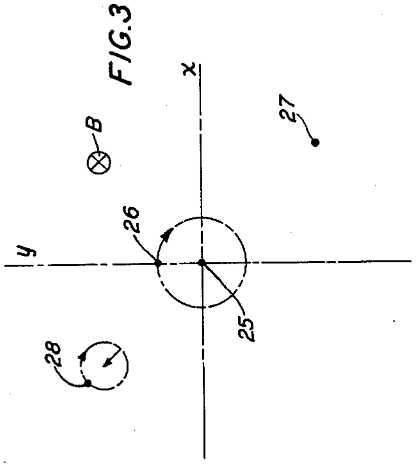
FIG. 3 is a diagrammatic illustration of the centers of mass of four exemplary electron beams that might be produced in the device of FIG. 1.

FIG. 3 illustrates the general nature of cyclotron and synchronous waves. That figure shows the centers of mass 25, 26, 27, and 28 of four exemplary electron beams that may be produced in the device of FIG. 1. The intersection of coordinates $x$ and $y$ indicates the central axis of the device. The direction of beam flow and the direction of the magnetic field B are "into the paper."

A completely unmodulated beam (and, therefore, a noiseless beam) has no net transverse velocity or displacement modulation. The center of mass 25 of such a beam therefore coincides with the axis of the tube. A beam which has received a net transverse velocity modulation, that is, cyclotron mode modulation, but no displacement modulation, will have a center of mass 26 at any cross-section that rotates around the tube axis at the cyclotron frequency. A beam which has received a net transverse displacement modulation, that is, synchronous wave modulation, will have a center of mass 27 at any cross-section which is displaced from the tube axis, but which does not rotate. A beam that has been modulated in both the cyclotron and synchronous modes will have a center of mass 28 that rotates about some point that is displaced from the tube axis.

An unmodulated beam having a center of mass 25 can be modulated either by extracting energy from the beam, in which case a negative-power slow wave is produced, or by adding energy to the beam, whereby a positive-power fast wave is produced. If an observer moves in the direction of flow of the beam at the beam's D.C. velocity, he will observe that a cyclotron wave will produce a center of mass rotation at the cyclotron frequency, whereas the beam will appear stationary when a synchronous wave is excited. If an observer is stationary, the beam center of mass will appear to rotate either clockwise or counterclockwise at a rate corresponding to the signal frequency. Clockwise rotation with respect to the direction of the D.C. magnetic field corresponds to either a fast cyclotron or slow synchronous wave. Counterclockwise rotation corresponds to a slow cyclotron or fast synchronous wave. The directions of rotation correspond to the sense of transverse field polarization required to excite the respective waves by a coupler. For a given polarization, coupling to a given wave occurs when the phase velocity of the electromagnetic wave approximates that of the beam wave.

Referring again to FIG. 1, there is included in axial order between electron gun 11 and slow wave circuit 22 a fast cyclotron wave noise stripper 29, a high-frequency quadrupole coupler 31 and a low-frequency quadrupole coupler 30. As the beam passes through noise stripper 29, spurious fast cyclotron mode noise waves are converted to electromagnetic waves, in a known manner, and are transmitted to, and dissipated by, an impedance 33. As the beam enters high-frequency coupler 31, its fast signal cyclotron mode is therefore substantially noiseless.

The purpose of high-frequency quadrupole coupler 31 is to transfer fast cyclotron mode energy to the slow synchronous mode, and conversely, to transfer slow synchronous mode energy to the fast cyclotron mode. The mechanism for this transfer will be be discussed hereinafter. Since the noise energy transferred to the slow synchronous mode from the fast cyclotron mode is substantially zero, due to prior stripping, the beam enters low-frequency quadrupole coupler 30 with a substantially noiseless slow synchronous mode.

The purpose of the low-frequency coupler 30 is to transfer slow synchronous mode energy to the slow cyclotron mode and vice versa so that when the beam enters the interaction region, its slow cyclotron mode is substantially noiseless. Signal energy entering slow wave circuit 22 from source 21 can then interact with the slow cyclotron mode as previously described and substantially no beam noise appears at the output with the amplified wave.

Figures 4, 5:
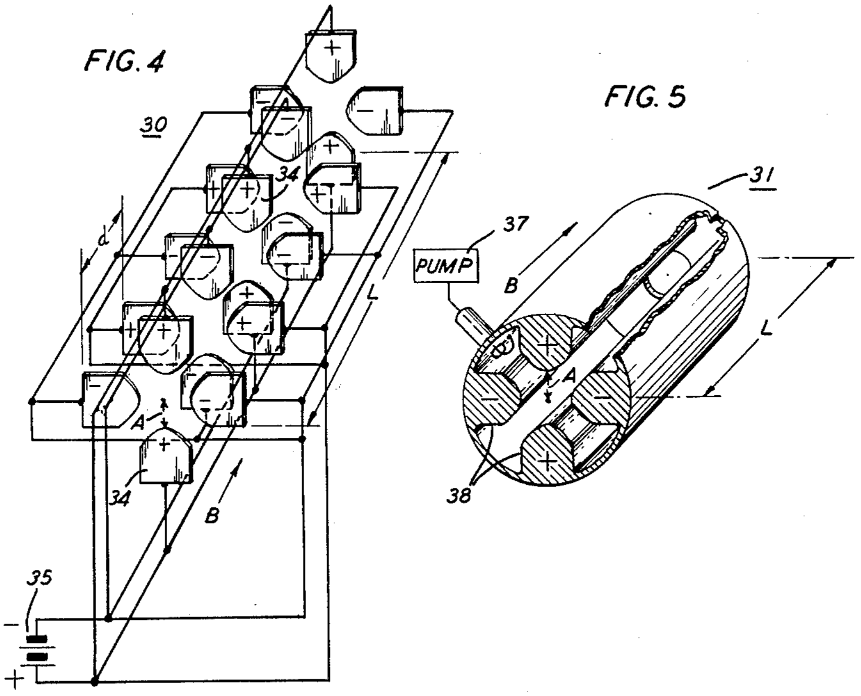
FIG. 4 is a perspective view of the low-frequency quadrupole coupler of the device of FIG. 1.
FIG. 5 is a perspective view of the high-frequency quadrupole coupler of the device of FIG. 1.

The low-frequency and high-frequency couplers are shown in perspective in FIGS. 4 and 5, respectively. The low-frequency quadrupole coupler 30 comprises a series of quadrupoles 34 that are biased by a D.-C. source 35 to produce an electrostatic field throughout the beam that is spatially alternating in both the longitudinal and circumferential senses of the beam, but which has no time alternating component. The high-frequency quadrupole coupler 31, on the other hand, is excited by a source of pump frequency energy 37 in the $\pi$ mode such that the electric field, produced by the R-F currents excited on poles 38, rotates with respect to time. As will be pointed out hereinafter, the pump frequency is substantially equal to the cyclotron frequency, which, in turn, is higher than the signal frequency. The low-frequency coupler of FIG. 4 is obviously structurally similar to the electrostatic pumping coupler disclosed in the aforementioned Gordon application, while the high-frequency coupler of FIG. 5 is similar to known pumping cavities for producing parametric amplification. The difference between our couplers for producing parametric amplification can be appreciated by considering the general conditions necessary for parametric amplification.

The two general conditions for parametric amplication are:

$$\omega_i = \omega_p - \omega_s \quad (1)$$

$$\beta_i = \beta_p - \beta_s \quad (2)$$

where $\omega_p$ is the angular pump frequency, $\omega_s$ is the angular signal frequency, $\beta_p$ is the phase constant of the pump wave, $\beta_s$ is the phase constant of the signal wave, $\omega_i$ is an idler frequency resulting from the pumping process and $\beta_i$ is the phase constant of the idler wave. When these conditions are applied to cyclotron wave devices wherein the signal and idler waves are cyclotron waves, which have phase constants $$\beta_s=(\omega_s-\omega_c)/u_0$$

and $$\beta_i=(\omega_i-\omega_c)/u_0$$

they lead to the known expression:

$$\omega_p-\beta_p u_0=2\omega_c \tag{3}$$

where $u_0$ is the D.-C. beam velocity and $\omega_c$ is the angular cyclotron frequency. It should be pointed out that in Equations 1 through 3 the signal, idler and pump frequencies and phase constants can assume either positive or negative values. Positive frequency values refer to the sense of polarization associated with fast mode propagation whereas negative frequency values refer to slow mode propagation. Equation 3 not only describes the basic condition of cyclotron wave parametric amplification, but it also demonstrates that the parametric variations necessary for such amplification can be solely time alternating, solely spatially alternating, or a combination of the two. In an electrostatic coupler of the type shown in FIG. 4, the electrodynamic component $\omega_p$ is zero while the spatially alternating component $\beta_p u_0$ is some finite value ($\beta_p$ is the number of radians of electric field rotation per unit length). In an electrodynamic coupler of the type shown in FIG. 5, the phase velocity of the pump wave is infinite and $\beta_p$ is therefore zero; the parametric variations result solely from the electrodynamic component $\omega_p$. Where a distributed circuit is used for propagating R-F pump energy, such as the slow wave circuit of FIG. 2, both spatial and time alternating electric field components are present.

We have found that sinusoidal energy transfer can be effected between the cyclotron and synchronous modes of a cyclotron wave device under substantially the following condition:

$$\omega_i=\omega_p+\omega_s \tag{4}$$

$$\beta_i=\beta_p+\beta_s \tag{5}$$

where $\omega_s$ refers to the frequency of energy in the synchronous mode with phase constant $\omega_s/u_0$ and $\omega_i$ refers to the frequency of energy in the cyclotron mode. Again, positive or negative values of frequency refer to fast or slow waves. Combining Equations 4 and 5 leads to the following relationship:

$$\omega_p-\beta_p u_0=\omega_c \tag{6}$$

Notice that the rate of parametric variations in our couplers is equal to the cyclotron frequency, rather than twice the cyclotron frequency as is the case in a parametric amplifier. Hence, in the high-frequency coupler of FIG. 5, the R-F pump frequency is equal to the cyclotron frequency because $\beta_p$ zero. In the electrostatic coupler the quantity $\beta_p u_0$ is equal to the cyclotron frequency because $\omega_p$ is zero. From FIG. 4 it can be seen that one spatial wavelength of the electrostatic field is equal to twice the distance $d$ between adjacent quadrupoles. To satisfy Equation 6, the distance $d$ should therefore be equal to the distance the beam travels during one-half of a cyclotron rotation. It should be pointed out that the couplers of FIGS. 4 and 5 are only illustrative of various structures that could alternatively be used to produce a quadrupole electric field of the desired space and time alternating frequency.

Figure 6:
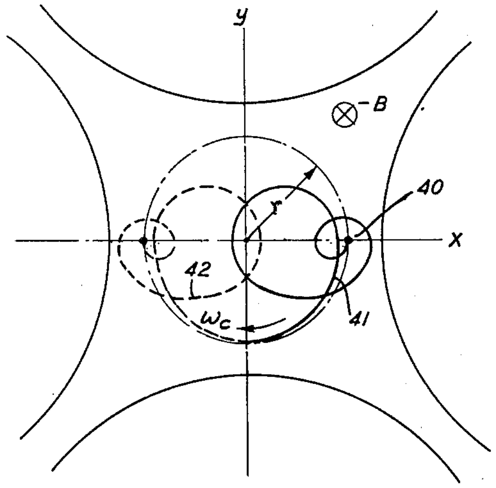
FIGS. 6 and 7 are diagrammatic illustrations of possible trajectories of the center of mass of the electron beam of the device of FIG. 1.

As was pointed out above, any quadrupole coupler satisfying Equation 6 transfers energy between the cyclotron and synchronous modes. A physical representation of this transfer is shown in FIG. 6. Assume that the beam, upon entering coupler 30, has no cyclotron wave modulation, but has synchronous wave modulation represented by a displacement from the tube axis of its center of mass 40 at a given cross-section. It can be shown that the center of mass 40 will begin to rotate and the center of rotation will begin to move toward the central axis of the tube. The center of mass will therefore follow a trajectory 41. It can further be shown that the radius of rotation of the beam will increase sinusoidally with time, so that rotation of the center of mass about the central axis with a radius equal to the original displacement represents complete transfer of synchronous wave energy to cyclotron wave energy. If, at this point, the beam emerges from coupler 30, synchronous wave energy at a given frequency will have been completely transferred to the cyclotron mode at a frequency defined by Equation 4.

If, on the other hand, the coupler is extended so that the beam continues to experience parametric variations, the transfer between modes will continue sinusoidally. In this case, the center of mass will follow trajectory 42 until eventually all of the cyclotron wave energy is retransferred back to the synchronous mode. From the foregoing, it is obvious that coupler 30 must be of some predetermined length so that the parametric variations terminate at a distance wherein a complete transfer between the cyclotron and synchronous modes have been effected. It can be shown that the length L of quadrupole 30 as shown in FIG. 4 is substantially determined by the equation:

$$L=\frac{(2n-1)}{2}\,\frac{\pi u_0 B}{|\text{grad } E_b|} \tag{7}$$

where $n$ is any integer, $|\text{grad } E_b|$ is the electric field gradient at the tube axis and B is the magnitude of the longitudinal magnetic flux density. The electric field gradient in the quadrupole couplers of FIGS. 4 and 5 can be shown to be:

$$|\text{grad } E_b|=\frac{Vq}{A^2} \tag{8}$$

where $V_q$ is the D.-C. or R.-F. potential applied to the coupler between positive and negative poles and A is the shortest distance between the coupler and the tube's central axis.

Figure 7:
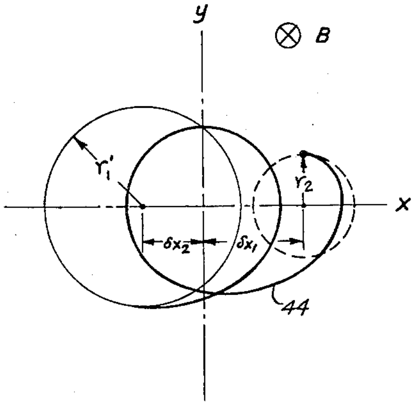

FIG. 7 has been included to show transfer between modes of a beam having a center of mass 43 that enters coupler 30 with both synchronous wave energy, represented by displacement $\delta x_1$, and cyclotron wave energy, represented by radius of rotation $r_2$. As the beam travels through the coupler, its center of mass will follow a trajectory 44, and, at the completion of one sinusoidal transfer, the original synchronous wave energy will be converted to cyclotron wave energy represented by radius of rotation $r_1$ while the original cyclotron wave energy will appear as synchronous wave energy, represented by displacement $\delta x_2$. It can be shown that $\delta x_1$ equals $r_1$ while $\delta x_2$ equals $r_2$.

FIGS. 6 and 7 illustrate the mode transfers effected by high-frequency quadrupole 31 of FIG. 5 as well as by the low-frequency coupler 30. As pointed out above, however, the transfer in the low-frequency coupler is between the fast cyclotron and fast synchronous modes while transfer in the high-frequency electrodynamic coupler is between the fast synchronous and slow cyclotron modes. The reason for this difference lies in the fact that the electrodynamic coupler is capable of adding energy to, or extracting energy from, the electron beam. Hence, it is possible to convert positive-power fast wave energy to negative-power slow wave energy with a high-frequency coupler; with an electrostatic coupler, fast mode energy must remain in the fast mode.

Consider, for example, the beam of FIG. 7 as it enters electrostatic coupler 30. If the original radius of rotation $r_2$ is a result of fast cyclotron wave modulation, the displacement $\delta x_2$, after mode transfer, will represent fast synchronous wave modulation. Likewise, if the original displacement $\delta x_1$ represents a fast synchronous wave, radius $r_1$ will represent a fast cyclotron wave. On the other hand, if the beam of FIG. 7 is traversing the electrodynamic coupler 31, and if $\delta x_1$ represents fast synchronous wave modulation, then $r_1$ will represent energy propagating in the slow cyclotron mode.

Table I is a summary of the interactions that can take place through parametric coupling by means of quadrupolar fields.

*Table I*

| | 1. Coupling | 2. Spatial dependence | 3. Pump requirement | Pump frequency | |
|---|---|---|---|---|---|
| | | | | 4. $\lvert\omega_p\rvert > \lvert\omega_s\rvert$ and $\lvert\omega_p\rvert > \lvert\omega_i\rvert$ | 5. $\lvert\omega_p\rvert < \lvert\omega_s\rvert$ and/or $\lvert\omega_p\rvert < \lvert\omega_i\rvert$ |
| 1. Parametric amplification | Active (lower sideband). $\omega_i=\omega_p-\omega_s$ $\beta_i=\beta_p-\beta_s$ | Exponential (amplification). | $\omega_p-\beta_p v=2\omega_c$ | Fast cyclotron-fast cyclotron; slow cyclotron-slow cyclotron. | Fast cyclotron-slow cyclotron. |
| 2. Mode transfer | Passive (upper sideband). $\omega_i=\omega_p+\omega_s$ $\beta_i=\beta_p+\beta_s$ | Sinusoidal (Kompfner dip). | $\omega_p-\beta_p v=\omega_c$ | Fast cyclotron-slow synchronous; slow cyclotron-fast synchronous. | Fast cyclotron-fast synchronous; slow cyclotron-slow synchronous. |

Row 1 discloses the conditions necessary for parametric amplification and has been included merely for purposes of comparison. Row 2, column 4, indicates the mode transfer that takes place in the high-frequency coupler wherein the electrodynamic pump frequency $|\omega_p|$ is higher than both the signal frequency $|\omega_s|$ and the idler frequency $|\omega_i|$, while row 2, column 5, indicates the mode transfer in the low-frequency coupler wherein the electrodynamic pump frequency is lower than either the signal or idler frequencies, as for example, in the electrostatic coupler wherein the pump frequency $\omega_p$ is zero. As is seen from Table I, quadrupole couplers that produce parametric variations at the cyclotron frequency effect energy transfer in both the fast and slow cyclotron and synchronous modes. Hence, there is a number of useful combinations of high-frequency and low-frequency quadrupole couplers that can be employed, depending on the results desired.

Figure 8:
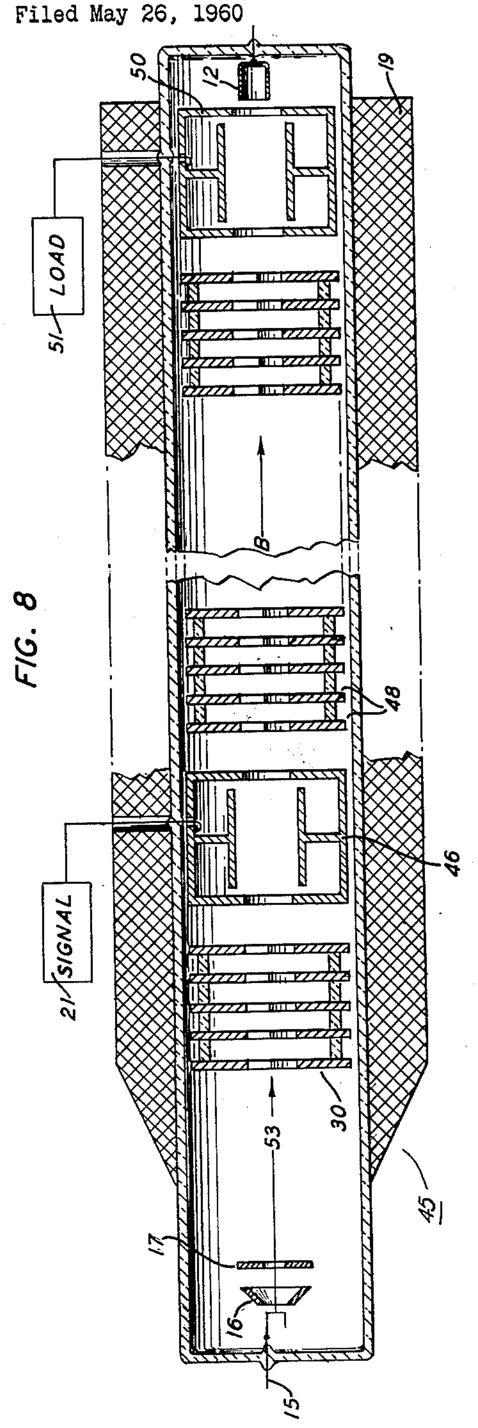
FIG. 8 is a sectional view of another embodiment of this invention.

Another illustrative embodiment of our invention is shown in FIG. 8. Device 45 of FIG. 8 comprises many of the same structural elements as device 10 of FIG. 1, which have been referenced accordingly. The amplifying mechanism of device 45 is identical to that disclosed in the aforementioned Gordon application. Input resonator 46 couples signal energy from source 21 to the fast cyclotron mode of the beam, thereby causing the signal to travel along the beam as a fast cyclotron wave. Extending along a length of the tube are a plurality of electrostatically charged quadrupoles 48 which converts D.-C. beam kinetic energy to fast signal cyclotron wave energy, thereby amplifying the signal wave. Biasing means for the quadrupoles have not been shown for purposes of simplicity. From row 1, column 5, of Table I, it is seen that this conversion is obtained through active coupling of the fast signal cyclotron wave with the slow idler cyclotron wave. Output resonator 50 extracts the amplified signal energy and transmits it to an appropriate load 51.

In the application of J. W. Kluver, Serial No. 19,553, filed April 4, 1960, now Patent No. 2,999,959, it is disclosed that the cyclotron wave noise originating on an electron beam is inversely proportional to the magnetic flux density at the cathode. Conversely, it can be shown that the synchronous wave noise originating on an electron beam is directly proportional to the magnetic flux density at the cathode. In the device of FIG. 8, the cathode is located outside of the magnetic field and so the noise originating in both the fast and slow synchronous modes is negligible. It is further pointed out in the Kluver application that changes in magnetic flux density must be adiabatic if deleterious mixing of the cyclotron and synchronous waves is to be avoided. Solenoid 19 is therefore tapered through a transition region 53 so that the change in flux density is gradual enough to fulfill the conditions of adiabatic transition.

Low-frequency quadrupole coupler 30 operates as described above to transfer energy between the synchronous and cylotron modes. Note from row 2, column 5, of Table I that the coupler transfers energy from the fast synchronous to the fast cyclotron mode and from the slow synchronous to the slow cyclotron mode. Consequently, both the slow and fast cyclotron modes are substantially noiseless as the beam leaves electrostatic coupler 30 and it is unnecessary to strip the fast cyclotron mode of its noise as is done in the aforementioned Gordon device. Further, the fact that the idler wave is a slow cyclotron wave is of no consequence because the slow cyclotron mode is also substantially noiseless.

It has already been pointed out that parametric amplification can be considered as resulting from active coupling between the signal wave and the lower sideband idler wave; see row 1, column 1, of Table I. Likewise, mode transfer can be considered as resulting from passive coupling between a signal frequency wave of one mode and an upper sideband frequency wave of another mode; see row 2, column 1, of Table I. Hence, in the electrodynamic coupler of FIG. 5, energy transfer can be considered as resulting from passive coupling between any synchronous wave of frequency $\omega_s$, and an idler cyclotron wave of frequency $\omega_i$, where $\omega_i$ is determined by Equation 4.

Figure 9:
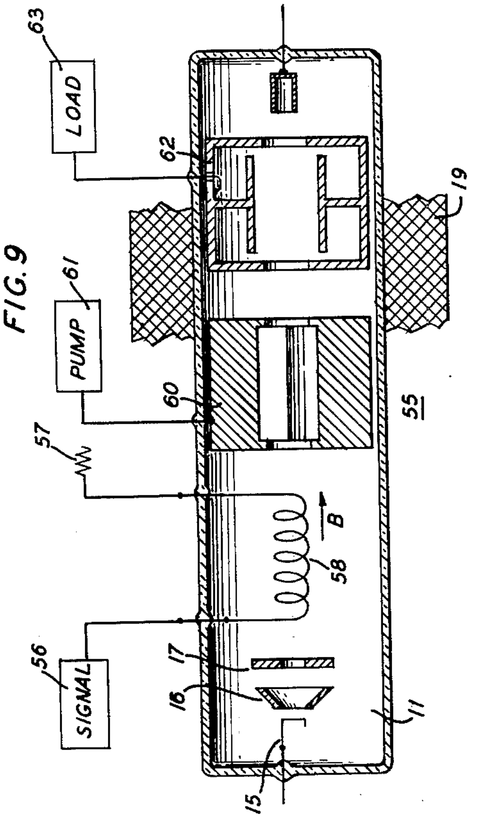
FIG. 9 is a sectional view of still another embodiment of this invention.

Referring now to FIG. 9, there is shown a device 55 which amplifies wave energy through the known principles of frequency "up-conversion." In the paper "Some General Properties of Nonlinear Elements, Part I" by J. M. Manley and H. E. Rowe, Proceedings of the Institute of Radio Engineers, volume 44, July 1956, pages 904–913, it is shown that where a variable reactance is used for conversion between a low frequency and an upper sideband, a theoretical gain equal to the ratio of the upper sideband frequency to the low frequency is attainable. It can further be shown that the theoretical minimum noise figure of such amplifiers is directly proportional to the ratio of the low frequency to the upper sideband frequency. These properties are known in the art as the Manley-Rowe relation. The purpose of device 55 is to amplify wave energy from signal source 56 by converting that energy to upper sideband idler frequency energy.

Energy from source 56 at frequency $\omega_s$ is coupled to the fast synchronous mode of the electron beam by input helix 58 which also extracts fast synchronous wave noise from the beam. The extracted noise energy is transmitted to and dissipated by, impedance 57. Synchronous wave helix 58 is similar in construction to helix 22 of FIG. 2. As the displacement modulations defining the fast synchronous wave noise travel through helix 58, they excite transverse electric fields on the helix. It should be pointed out that the excited transverse fields on helix 58 rotate in a clockwise direction with respect to distance, rather than the counterclockwise direction shown in FIG. 2. The phase velocity of the wave excited on helix 58 is substantially equal the D.-C. velocity of the beam to insure synchronism with the fast synchronous wave. Quadrupole coupler 60 is excited from source 61 with pump energy at a frequency $\omega_p$ equal to the cyclotron frequency. Coupler 60 is identical with the electrodynamic coupler of FIG. 5, and it serves to transfer energy between the cyclotron and synchronous modes. As pointed out above, this transfer results from coupling between the signal wave and an upper sideband idler wave having a frequency equal to the sum of the signal and pump frequencies. The power $P_i$ carried on the upper sideband idler cyclotron wave, as determined by the Manley-Rowe relations, and as can be shown from considerations of beam dynamics, is:

$$P_i = P_s\frac{\omega_i}{\omega_s} = P_s\frac{\omega_p + \omega_s}{\omega_s} \quad (9)$$

where $P_s$ is the power of the signal energy transferred to the synchronous mode of the beam. The noise figure F is given by:

$$F = 1 + \frac{\omega_s}{\omega_i} \quad (10)$$

It can be seen from Equation 9 that if the pump frequency is much higher than the signal frequency, an appreciable gain in power can be realized. Likewise, from Equation 10, such high gain will be accompanied by a low noise figure.

It should be pointed out that the production of an amplified upper sideband wave is a product of the phenomenon which also produces energy transfer between the synchronous and cyclotron modes. Hence, the amplified upper sideband wave must be extracted from the cyclotron mode. Cyclotron wave extraction cavity 62 is included at the output end of tube 55 for this purpose.

With reference to the upper sideband idler frequency, quadrupole coupler 60 acts as a low-frequency coupler; the pump frequency is lower than the upper sideband frequency. Hence, the mode transfer which results in the production of the amplified upper sideband frequency idler wave takes place between the fast cyclotron and fast synchronous modes. Because the idler wave travels as a positive-power fast wave, it is possible to extract it from the beam. After the fast cyclotron wave has been extracted by cavity 62, it is transmitted to a load 63.

As can be appreciated from the foregoing discussion, the devices shown on the drawing are merely exemplary of various uses of our invention. For example, in the device of FIG. 1, interaction could be effected with the slow synchronous wave, rather than the slow cyclotron wave, thereby obviating the necessity of high-frequency coupler 31. Further, various types of couplers other than those illustrated in FIGS. 4 and 5 may be built which satisfy the requirements of our inventive concept to effect transfers between the cyclotron and synchronous modes. Various other arrangements may be made by those skilled in the art without departing from the spirit and scope of our invention.

What is claimed is:

1. An electron discharge device comprising means for forming and projecting an electron beam along a path, means for producing a magnetic focusing field throughout said beam thereby creating an inserent angular cyclotron frequency within and of said beam, a source of signal wave energy, means for modulating said beam with signal wave energy comprising means for producing transverse signal frequency electric fields along a portion of said beam, and means for producing a quadrupole electric field along another portion of said beam, the spatial and time alternations of said quadrupole electric field being substantially determined by the relationship:

$$\omega_p - \beta_p u_0 = \omega_c$$

where $\omega_p$ is the angular frequency of time alternations of said quadrupole electric field, $\beta_p$ is the angular frequency of longitudinal spatial alternations of said quadrupole electric field, $u_0$ is the mean velocity of said beam, and $\omega_c$ is said angular cyclotron frequency.

2. The electron discharge device of claim 1 wherein said quadrupole electric field producing means extends along said beam path a distance L substantially determined by:

$$L = \frac{(2n-1)}{2}\,\frac{\pi u_0 B}{|\text{grad } E_b|}$$

wherein $n$ is any integral number, and $|\text{grad } E_b|$ is the quadrupole electric field gradient produced by said electric field producing means at the central axis of said beam path and B is the flux density of said magnetic focusing field.

3. The electron discharge device of claim 2 wherein said electron beam is characterized by fast and slow synchronous modes of propagation and fast and slow cyclotron modes of propagation, and wherein said electric field producing means comprises means for transferring fast cyclotron mode signal frequency beam energy to slow synchronous mode energy and for transferring slow synchronous mode signal frequency beam energy to fast cyclotron mode energy, and wherein said frequency of said time alternations of said electric field is higher than said signal frequency.

4. The electron discharge device of claim 2 wherein said electron beam is characterized by fast and slow synchronous modes of propagation and fast and slow cyclotron modes of propagation, and wherein said electric field producing means comprises means for transferring fast cyclotron mode signal frequency beam energy to fast synchronous mode energy and for transferring fast synchronous mode signal frequency beam energy to fast cyclotron mode energy, and wherein said frequency of said time alternations of said electric field is lower than said signal frequency.

5. An electron beam device comprising means for forming and projecting at a predetermined velocity a beam of electrons along a path, means for producing a magnetic field throughout said beam thereby producing in said beam an inherent cyclotron frequency, transmitting means extending along a portion of said path for propagating signal wave energy in interacting relationship with said beam, and coupling means interposed between said beam forming means and said transmitting means for causing said beam to experience parametric variations of a frequency substantially equal to said cyclotron frequency, said coupling means extending along said path a distance substantially equal to:

$$\frac{(2n-1)}{2}\,\frac{\pi u_0 B}{|\text{grad } E_b|}$$

where $n$ is any integer, $u_0$ is said predetermined velocity, $|\text{grad } E_b|$ is the electric field gradient produced by said coupler along the central axis of said beam path, and B is the magnetic flux density of said magnetic field.

6. An electron discharge device comprising means for forming and projecting an electron beam, means for producing a magnetic field throughout a major portion of said beam thereby producing an inherent cyclotron frequency in said beam, said electron beam being characterized by fast and slow cyclotron and synchronous modes of propagation, input means for modulating said beam in the fast cyclotron mode with signal wave energy, means for amplifying said signal wave comprising a plurality of electrostatically charged quadrupole arrays surrounding said beam, output means for extracting said amplified signal wave, and a coupler between said beam forming means and said input means for converting slow synchronous wave energy to fast cyclotron wave energy, said coupler comprising means for producing a spatially alternating quadrupole electric field along a portion of said beam, the phase constant of the longitudinal spatial alternations multiplied by the mean velocity of said beam being substantially equal to said cyclotron frequency.

7. An electron beam device comprising means for forming and projecting an electron beam along a longitudinal path, means for producing a magnetic field throughout a major portion of said beam thereby producing an inherent cyclotron frequency in said beam, means for modulating said beam with signal frequency energy, a coupler surrounding a portion of said path, said coupler comprising four elongated poles each substantially parallel with said path, and alternating current means for exciting opposite electrical polarities on adjacent ones of said poles, the frequency of said alternating current being substantially equal to said cyclotron frequency, said coupler extending along said path a longitudinal distance substantially equal to:

$$\frac{(2n-1)}{2}\frac{\pi u_0 B}{|\text{grad } E_b|}$$

where $n$ is any integral number, $u_0$ is the mean velocity of said beam, $|\text{grad } E_b|$ is the electric field gradient produced by said electrically excited poles at the central axis of said path, and B is the magnetic flux density of said magnetic field.

8. An electron beam device comprising means for forming and projecting an electron beam along a longitudinal path, means for producing a magnetic field throughout a major portion of said beam thereby producing an inherent angular cyclotron frequency in said beam, means for modulating said beam with signal frequency energy, a coupler surrounding a portion of said path, said coupler comprising a plurality of axially arranged quadrupoles, and means for producing an opposite electrostatic polarity on adjacent poles of each quadrupole and on adjacent poles of successive quadrupoles whereby a longitudinal spatially alternating electrostatic field is produced on said beam, the spacing between successive quadrupoles being such that the number of radians per unit length of the longitudinal spatial electrostatic alternations multipled by the mean beam velocity is substantially equal to said angular cyclotron frequency, said coupler extending along said path a distance substantially equal to:

$$\frac{(2n-1)}{2}\frac{\pi u_0 B}{|\text{grad } E_b|}$$

where $n$ is any integral number, $u_0$ is the mean velocity of said beam, $|\text{grad } E_b|$ is the electric field gradient produced by said coupler at the central axis of said path, and B is the magnetic flux density of said magnetic field.

9. An electron discharge device comprising means for forming and projecting a beam of electrons along a path, said beam being characterized by a cyclotron mode of propagation and a synchronous mode of propagation, means extending along a portion of said path for propagating electromagnetic wave energy in coupling relationship with said beam, said propagating means comprising means for causing electric field components that are transverse with respect to said beam to interact with said beam, means extending along another portion of said path for transferring energy propagating in said cyclotron mode to said synchronous mode and for transferring energy propagating in said synchronous mode to said cyclotron mode, and output means for removing said electromagnetic wave energy from said propagating means.

10. An electron beam device comprising means for forming and projecting a beam of electrons along a path, said beam being characterized by fast and slow cyclotron modes of propagation and fast and slow synchronous modes of propagation and spurious noise waves, means for extracting noise waves from said fast cyclotron mode, means for transferring fast cyclotron mode beam energy to the slow synchronous mode and for transferring slow synchronous mode beam energy to the fast cyclotron mode, means for transferring slow synchronous mode beam energy to the slow cyclotron mode and for transferring slow cyclotron mode beam energy to the slow synchronous mode, and means extending along a portion of said path for propagating electromagnetic wave energy in interacting relationship with the slow cyclotron mode of said beam.

11. An electron beam device comprising means for forming and projecting a beam of electrons, said beam being characterized by fast synchronous and fast cyclotron modes of propagation, means for transferring wave energy to the fast synchronous mode of said beam, means for transferring fast synchronous mode energy to the fast cyclotron mode of said beam, and means for extracting fast cyclotron mode energy from said beam.

12. An electron discharge device comprising means for forming and projecting a beam of electrons along a path, said beam being characterized by fast cyclotron and synchronous modes of propagation and slow cyclotron and synchronous modes of propagation and noise waves thereon, means for extracting noise waves from one of said fast modes thereby making said one fast mode substantially noiseless, means for exchanging energy between said one fast mode and one of said slow modes thereby making said one slow mode substantially noiseless, and means for causing electromagnetic wave energy to interact with said one slow mode.

No references cited.